(12) United States Patent  (10) Patent No.: US 8,837,742 B2
Liu  (45) Date of Patent: Sep. 16, 2014

(54) DYNAMIC SYNCHRONIZATION OF DISTRIBUTED KEYS FOR ENCRYPTION AND DECRYPTION OF NETWORK COMMUNICATIONS

(75) Inventor: Xin Hua Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/640,180

(22) PCT Filed: Apr. 15, 2011

(86) PCT No.: PCT/EP2011/055999
§ 371 (c)(1),
(2), (4) Date: Oct. 26, 2012

(87) PCT Pub. No.: WO2011/134807
PCT Pub. Date: Nov. 3, 2011

(65) Prior Publication Data
US 2013/0067213 A1  Mar. 14, 2013

(30) Foreign Application Priority Data
Apr. 30, 2010  (CN) .......................... 2010 1 0171638

(51) Int. Cl.
*H04L 29/06*  (2006.01)
(52) U.S. Cl.
CPC .................................. *H04L 63/068* (2013.01)
USPC .......................................... 380/283; 713/150
(58) Field of Classification Search
CPC ................ H04L 9/0838; H04L 63/061; G06F 17/30952
USPC ...................................................... 713/150
See application file for complete search history.

(56) References Cited

U.S. PATENT DOCUMENTS 5,185,796 A  2/1993  Wilson
6,742,116 B1 *  5/2004  Matsui et al. ................. 713/171
(Continued)

FOREIGN PATENT DOCUMENTS

CN  101473588 A  7/2009
EP  0786881 A2  7/1997
(Continued)

OTHER PUBLICATIONS

Javier Olaechea, Authorized Officer/Examiner, European Patent Office (as International Searching Authority), PCT International Search Report for Application No. PCT/EP2011/055999, Apr. 7, 2011, pp. 1-3, Rijswijk, The Netherlands.

(Continued)

*Primary Examiner* — Hadi Armouche
*Assistant Examiner* — Bryan Wright
(74) *Attorney, Agent, or Firm* — Lee Law, PLLC; Christopher B. Lee

(57) ABSTRACT

Dynamic encryption for network communication includes distributing a key to a network entity and storing the key into the key table. A key in the key table is used to encrypt data, and an index of the used key in the key table is attached to the encrypted data. The encrypted data is sent to the network entity. Dynamic decryption for a network communication includes receiving a key from a network entity and storing the received key into a key table. Encrypted data is received from the network entity. A key in the key table is located based on an index attached to the data and the data is decrypted with the located key.

17 Claims, 7 Drawing Sheets

(56) References Cited

U.S. PATENT DOCUMENTS

| | | | |
|---|---|---|---|
| 7,243,234 B2* | 7/2007 | Newkirk | 713/171 |
| 7,386,575 B2* | 6/2008 | Bashant et al. | 1/1 |
| 8,194,858 B2* | 6/2012 | Bukshpun et al. | 380/277 |
| 2003/0043800 A1* | 3/2003 | Sonksen et al. | 370/389 |
| 2003/0219129 A1* | 11/2003 | Whelan et al. | 380/270 |
| 2004/0101142 A1* | 5/2004 | Nasypny | 380/278 |
| 2006/0053368 A1* | 3/2006 | Bosworth et al. | 715/513 |
| 2006/0098818 A1* | 5/2006 | Fifer et al. | 380/37 |
| 2008/0019525 A1 | 1/2008 | Kruegel et al. | |
| 2009/0041247 A1 | 2/2009 | Barany et al. | |

FOREIGN PATENT DOCUMENTS

| | | |
|---|---|---|
| KR | 20090024482 A | 3/2009 |
| WO | 2007149892 A2 | 12/2007 |

OTHER PUBLICATIONS

Author Unknown, Examiner, State Intellectual Property Office of the People's Republic of China, Office Action for Chinese Application No. CN201010171638.3, May 15, 2013, pp. 1-6, Beijing, PRC.

* cited by examiner

US 8,837,742 B2

DYNAMIC SYNCHRONIZATION OF DISTRIBUTED KEYS FOR ENCRYPTION AND DECRYPTION OF NETWORK COMMUNICATIONS

RELATED APPLICATIONS

This application is a National Stage application of, claims priority to, and claims the benefit of International Application Serial No. PCT/EP2011/055999, titled "DYNAMIC ENCRYPTION AND DECRYPTION FOR NETWORK COMMUNICATION," which was filed on Apr. 15, 2011, in the European Patent Cooperation Treaty Receiving Office, and which further claims priority to, and claims the benefit of Chinese Patent Application Serial No. 201010171638.3, titled "DYNAMIC ENCRYPTION AND DECRYPTION METHODS AND EQUIPMENT FOR NETWORK COMMUNICATION," which was filed on Apr. 30, 2010, in the State Intellectual Property Office of the People's Republic of China; the entire contents of each application are hereby incorporated by reference as if fully set forth herein.

BACKGROUND

Embodiments of the present invention relate to the field of computer network technology. More particularly, embodiments of the present invention relate to dynamic encryption and decryption for network communication.

With the development of network technology, network communication has become increasingly prevalent. In many cases, when a communication channel is established between network entities distributed in different locations or within an internal network (for example an intranet), it is required to encrypt the data transferred over the channel. For example, when communicating on a transmission control protocol/internet protocol (TCP/IP) public network (for example, Internet), it is generally required to encrypt the network communication at the IP layer so as to guarantee the security and integrity of communication data.

The Internet protocol security (IPSec) provides a solution for IP communication security. It prescribes a method for protecting private information communicated over a public network. The service supported by the IPSec includes creditability (encryption), authenticity (sender certification), integrity (data tamper detection) and reply protection (preventing unauthorized data retransmission). The IPSec further prescribes a key management mechanism called Internet Key Exchange (IKE), for establishing a key for encrypting and decrypting information.

BRIEF SUMMARY

A method for dynamic encryption for network communication includes: distributing a key to a network entity; storing the key in a key table; encrypting data with an indexed key in the key table; attaching an index of the indexed key in the key table to the encrypted data; and sending the encrypted data with the attached index of the indexed key to the network entity.

A method for dynamic decryption for network communication includes: receiving a key from a network entity; storing the received key in a key table; receiving encrypted data from the network entity, where the encrypted data comprises an attached index; locating an indexed key in the key table according to the index attached to the encrypted data; and decrypting the encrypted data with the located indexed key.

An apparatus for implementing dynamic encryption for network communication includes: a communication module; and a processor programmed to: distribute a key to a network entity; store the key into a key table; encrypt data with an indexed key in the key table; attach an index of the indexed key in the key table to the encrypted data; and send the encrypted data with the attached index of the indexed key to the network entity via the communication module.

An apparatus for implementing dynamic decryption for network communication includes: a communication module; and a processor programmed to: receive a key from a network entity via the communication module; store the received key in a key table; receive encrypted data from the network entity via the communication module, where the encrypted data comprises an attached index; locate an indexed key in the key table according to the index attached to the encrypted data; and decrypt the encrypted data with the located indexed key.

DETAILED DESCRIPTION

Figure 1:
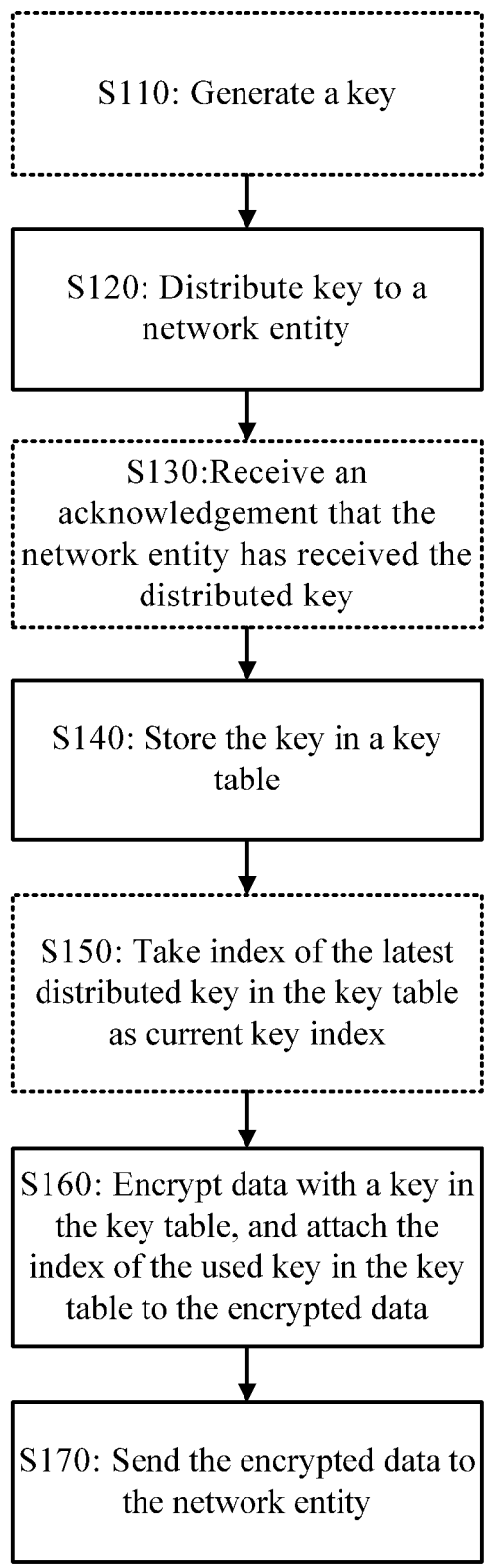
FIG. 1 is a flow chart of an example of an implementation of a process for dynamic encryption for network communication according to an embodiment of the present subject matter.

Hereinafter, methods and apparatuses according to the present invention will be described in detail through use of example embodiments with reference to the accompanying drawings. It should be understood that the illustrated and depicted embodiments are only examples intended to explain the principle of the present invention, and are not intended to limit the scope of the present invention.

It should be noted that conception of the present subject matter resulted from a recognition of certain limitations associated with conventional encryption and decryption approaches. For example, it was recognized that an encrypted channel should at least satisfy the requirements in the following aspects:

(1) Performance impact. After performing encryption, data transfer performance should not be significantly reduced.

(2) Key agility. A key for encrypting data should be dynamically changeable on the fly, and an effective lifetime for each key should be as short as possible. In other words, the key should be changed as soon as possible so as to improve the encryption intensity of the channel.

(3) Adaptability of the encryption method. Various kinds of encryption algorithms should be supported. Preferably, it should be adaptable to a hardware encryption algorithm, since for a given application and algorithm, hardware implementation is generally far quicker than software implementation.

(4) Low memory requirement. Implementation of the encryption communication channel should consume the least storage resources possible so as to adapt to an application environment of limited storage space (e.g., a dedicated encryption router, etc.).

It was further determined that the Internet protocol security (IPSec) does not satisfy the above requirements well and at least has the following drawbacks. First, it was observed that an additional header for an IPSec and encapsulating security payload/authentication header (ESP/AH) protocol, and corresponding processing and repackaging to the security Internet protocol (IP) datagram, consume considerable processing resources and storage resources. It was further observed that, while several variations of IPSecs have been developed to address such problems, these variations cannot satisfy performance requirements under certain crucial conditions. Second, it was also observed that a minimum configurable effective lifetime of the key in the IPSec is one (1) second, and in most cases, a default key effective lifetime is configured to be one (1) hour or longer. However, it was determined that for a high bandwidth/speed network, the user may be required to change the key more frequently. Third, it was observed that the user is very likely to use a known algorithm to perform encryption/decryption with his/her own hardware device/card, but the IPSec does not support dedicated hardware well.

The present subject matter improves communications technology by providing dynamic encryption and decryption for network communication that satisfies the above requirements. The present technology provides a light-weight solution that may be implemented, managed, and modified dynamically. The present technology provides an approach to dynamically generate, distribute, synchronize, and use a key based upon factors such as an effective lifetime requirement of the key and network condition(s), to implement a higher key agility, and to achieve a greater protection strength and security level. Moreover, the present subject matter supports customized implementation of encryption and decryption, for example, by supporting a dedicated hardware-based implementation. In particular, the technical solutions of the present technology may be implemented with a known network protocol data structure and format, thereby achieving a higher compatibility and efficiency. In addition, the present technology allows encryption and decryption to be implemented with less storage and processing resources.

In the following description, the term "first network entity" is used to indicate a party initiating key synchronization and sending data, and the term "second network entity" is used to indicate a party accepting the key synchronization and receiving the data. It should be understood that the first network entity and the second network entity may be any network entity capable of performing data transmission.

FIG. 1 is a flow chart of an example of an implementation of a process for dynamic encryption for network communication.

The process starts from step S110, where a key is generated. For example, a first network entity may generate a key as requested or as instructed. In an embodiment, a first network entity may dynamically generate a new key based on an effective lifetime of the key. In other embodiments, the first network entity may generate a key based on the current network condition(s), user input, or any other one or more conditions.

It should be noted that step S110 is optional. For example, in some embodiments, the key may be provided from an external entity, instead of being generated within the first network entity. In this case, step S110 may be omitted.

At step S120, the first network entity distributes a key to the second network entity. In an embodiment, in order to guarantee the security of the key, the first network entity may distribute the key to the second network entity over a security channel. For example, a security channel may be an asymmetrically encrypted socket channel. The first network entity encrypts the key to be distributed with a public key, and then sends it to the second network entity. After receiving the key, the second network entity uses a corresponding private key to perform decryption to obtain the key to be used.

In addition to distributing the key over the security channel, the first network entity may further dynamically distribute the key to the second network entity in another electronic and/or physical manner.

At step S130, an acknowledgement that the key has been received by the second network entity is received. In this way, key synchronization between the first network entity and the second network entity may be guaranteed. In other words, the key used by the first network entity in the subsequent communication has been received and stored by the second network entity.

It should be noted that step S130 is optional. For example, in some embodiments, the first network entity and the second network entity may maintain key synchronization in a predetermined manner. For example, through properly designing a key table (which will be depicted with reference to S140) of the first network entity and second network entity, key synchronization therebetween may be maintained. In this case, the first network entity need not receive the acknowledgement from the second network entity.

It should be noted that, though guaranteeing key synchronization between the first network entity and the second network entity may help the receiver to perform correct decryption, it is not necessary. Without guaranteeing key synchronization between the first network entity and the second network entity, the receiver may not perform correct decryption. This case may be regarded as packet dropout or transmission error during the communication process. This error may perform error recovery based on an actual implementation and a network protocol in use. For example, in a transmission control protocol/internet protocol (TCP/IP) protocol-based implementation, the situation may be corrected by retransmission over the transmission layer and will not be detailed further here.

At step S140, the key is stored in a key table. The first network entity stores the distributed key in an accessible key table. The key table may be any data structure capable of storing and retrieving a key, for example, a list, a queue, a stack, a heap, a database, a file, and a combination thereof.

In particular, in an embodiment, the key table may be implemented as a first-in first-out (FIFO) queue. In this case, if the network condition is timely, then the keys that are distributed by the first network entity will arrive at the second network entity according to the distribution order, and will be stored in the key table sequentially. Therefore, as long as the queue is long enough, the key tables in the first network entity and second network entity may constantly maintain synchronized, without the necessity of performing the above step S130.

In another embodiment, considering the restraints of actual network conditions and storage resources, the key table may be implemented as a cyclic queue. In other words, the key table may be implemented as a FIFO queue with a fixed length. When the key table is full and a new key is to be inserted, the earliest stored key (namely, the oldest key) may be removed from the key table.

At step S150, the index of the latest distributed key in the key table is taken as a "current key index." In this way, the current key index is always associated with the latest key that is most-recently distributed by the first network entity. In an embodiment, in a subsequent communication with the second network entity, the first network entity may encrypt and decrypt data with the key associated with the current key index (namely, the most-recently distributed key), to enhance the protection strength.

It should be noted that step S150 is optional. As depicted hereinafter for step S160, in some embodiments, another standard may be used to select a key to be used. At this point, step S150 may be omitted.

At step S160, a key in the key table is used to encrypt data, and the index of the used key in the key table is attached to the encrypted data.

The first network entity may select a key to be used in any manner. As depicted above, in some embodiments where step S150 is performed (namely, the first network entity maintains the "current key index"), the first network entity may select a key associated with the current key index to encrypt data. In other embodiments, the first network entity may select a key from the key table according to any other standard or even randomly for encrypting data.

Then the first network entity attaches the index of the key for encrypting data in the key table to the encrypted data. The attachment may be implemented through various kinds of embodiments.

For example, in an embodiment, a data packet structure may be customized for the first network entity and second network entity, for packaging the encrypted data and key index.

According to an embodiment of the present technology, the first network entity and the second network entity may use an existing data packet format that uses an established network protocol, instead of a customized data packet. In this way, an efficient encrypted transmission may be implemented with an existing network protocol. For example, the first network entity may write the key index into one or more unused/reserved bits in a header of a data packet of the established network protocol. In this way, modification to the established network protocol may be avoided, thereby achieving improved compatibility and efficiency. In this embodiment, suppose a key table is implemented by a cyclic queue form, then the length of the cyclic queue may be determined dependent upon the number of unused/reserved bits available in the data packet header. For example, if the data packet header has "n" (n≥1) unused/reserved bits available for writing the key index, then the unused/reserved bit(s) may represent two raised to the power of "n" (e.g., $2^n$) values in total. Except for a plain text datagram, the length of a key table cyclic queue may be defined as two raised to the power of "n" minus one (e.g., $(2^n)-1$).

Additionally, in an embodiment, in order to guarantee data integrity, header calibration and checking may be performed between the first network entity and the second network entity. In this case, when the first network entity inserts a key index into a header, a checksum of the header may be regenerated.

At step S170, the encrypted data is sent to the second network entity. It may be understood that since the key index has been attached to the data, the index is further sent to the second network entity at the same time. In this way, the second network entity may search for and identify a key for decryption in its key table based on the attached index. As described above, since their key tables may be synchronized, the second network entity may correctly decrypt data using the key identified using the key index. As such, the process of FIG. 1 provides a method for dynamic encryption for network communication, including: distributing a key to a network entity; storing the key into the key table; using the key in the key table to encrypt data, and attaching an index of the used key in the key table to the encrypted data; and sending the encrypted data to the network entity. The decryption method will be further described with reference to FIG. 2.

Figure 2:
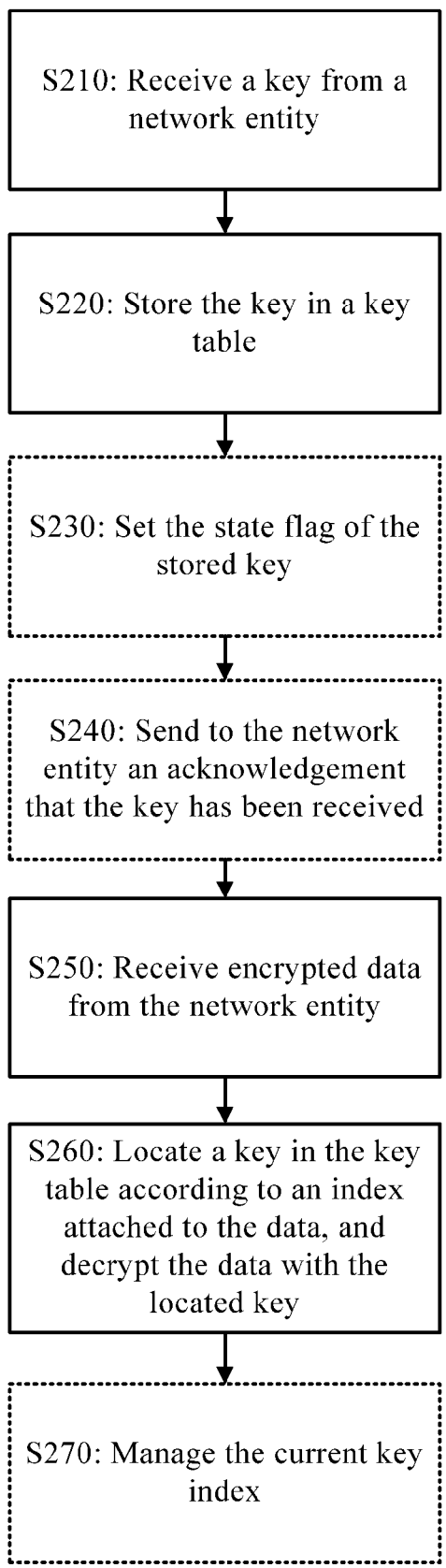
FIG. 2 is a flow chart of an example of an implementation of a process for dynamic decryption for network communication according to an embodiment of the present subject matter.

FIG. 2 is a flow chart of an example of an implementation of a process for dynamic decryption for network communication.

The method starts from step S210, where a key is received by a second network entity from a first network entity. Similar to step S120 in FIG. 1, in order to guarantee the security of the key, the second network entity may receive the key from the first network entity over a security channel. The specific embodiment has been depicted above with reference to step S120 of FIG. 1 and will not be detailed here. In other embodiments, the second network entity may further receive key from the first network entity in another electronic and/or physical manner.

At step S220, the received key is stored in a key table. As described above, the key table may be implemented through any suitable data structure and may be implemented as a cyclic queue.

At step S230, a state flag of the stored key is set. Each key stored in the key table may have an associated state flag. In particular, after storing the key, its state flag may be set as "unused." After the key is first used, its state flag may be set as "used."

It should be noted that step S230 is optional. The purpose for setting a state flag of a key is to manage the "current key index" (to be described hereinafter). Thus, when there is no need to manage the current key index, step S230 may be omitted.

Step S240, an acknowledgement of reception of the key is sent to the first network entity. In this way, key synchronization between the first network entity and the second network entity may be guaranteed. In other words, the key used by the first network entity in the subsequent communication may be received and stored by the second network entity.

It should be noted that step S240 is optional. In some embodiments, the first network entity and the second network entity may maintain key synchronization through a predetermined manner, or it may be unnecessary to guarantee synchronization of the key table, which has been described above and will not be detailed here.

At step S250, encrypted data are received from the first network entity. As described above with reference to the corresponding data encryption process, the data is attached with an index of the key that was used to encrypt the data. Thus, at step S250, the second network entity also receives the index of the key.

Then, at step S260, a key is located in the key table according to the index attached to the data, and the data is decrypted with the located key. As previously mentioned, since the key tables between the first network entity and the second network entity are synchronous, the key located by the second network entity in its key table corresponds to the key used by the first network entity for encryption. With the index, the second network entity may correctly decrypt the encrypted data.

It should be noted that for a key table of a cyclic queue or with any length limitation, due to delay during the network transmission process, the key used with the data arriving at the second network entity may already be deleted from the key table. At this point, the key located according to the index may not be a correct key, which will further cause decryption error. This case may be regarded as packet dropout or transmission error during the communication process. This second network entity may perform error recovery according to specific application and the network protocol in use. For example, in a TCP/IP protocol-based implementation, recovery may be performed by retransmission over the transmission layer. In particular, if the first network entity uses the most-recently distributed key to encrypt data, then in the case of retransmission, the data will be encrypted by the most-recently distributed key, and therefore may be correctly decrypted at the second network entity.

At step S270, the current key index is managed. It should be noted that step S270 is optional. As mentioned above, considering the lifetime of the key, it may be desired to protect data transmission with the most-recently distributed key. At this point, step S270 is implemented, where the current key index is set to indicate the position of the key most-recently received by the second network entity as distributed by the first network entity in the key table (in particular, a cyclic key table). When the second network entity sends data to the first network entity afterwards, it may encrypt data with the key associated with the current key index (namely, the key most-recently distributed by the first network entity). In this case, the first network entity correspondingly maintains a current key index associated with the most-recently distributed key, to thereby correctly decrypt data. In other cases, step S270 may be omitted. As such, the process of FIG. 2 provides a method for dynamic decryption for a network communication, including: receiving a key from a network entity; storing a received key into a key table; receiving encrypted data from the network entity; and locating a key in the key table based on an index attached to the data and decrypting the data with the located key. Hereinafter, an example implementation of step S270 will be described with reference to FIG. 3.

Figure 3:
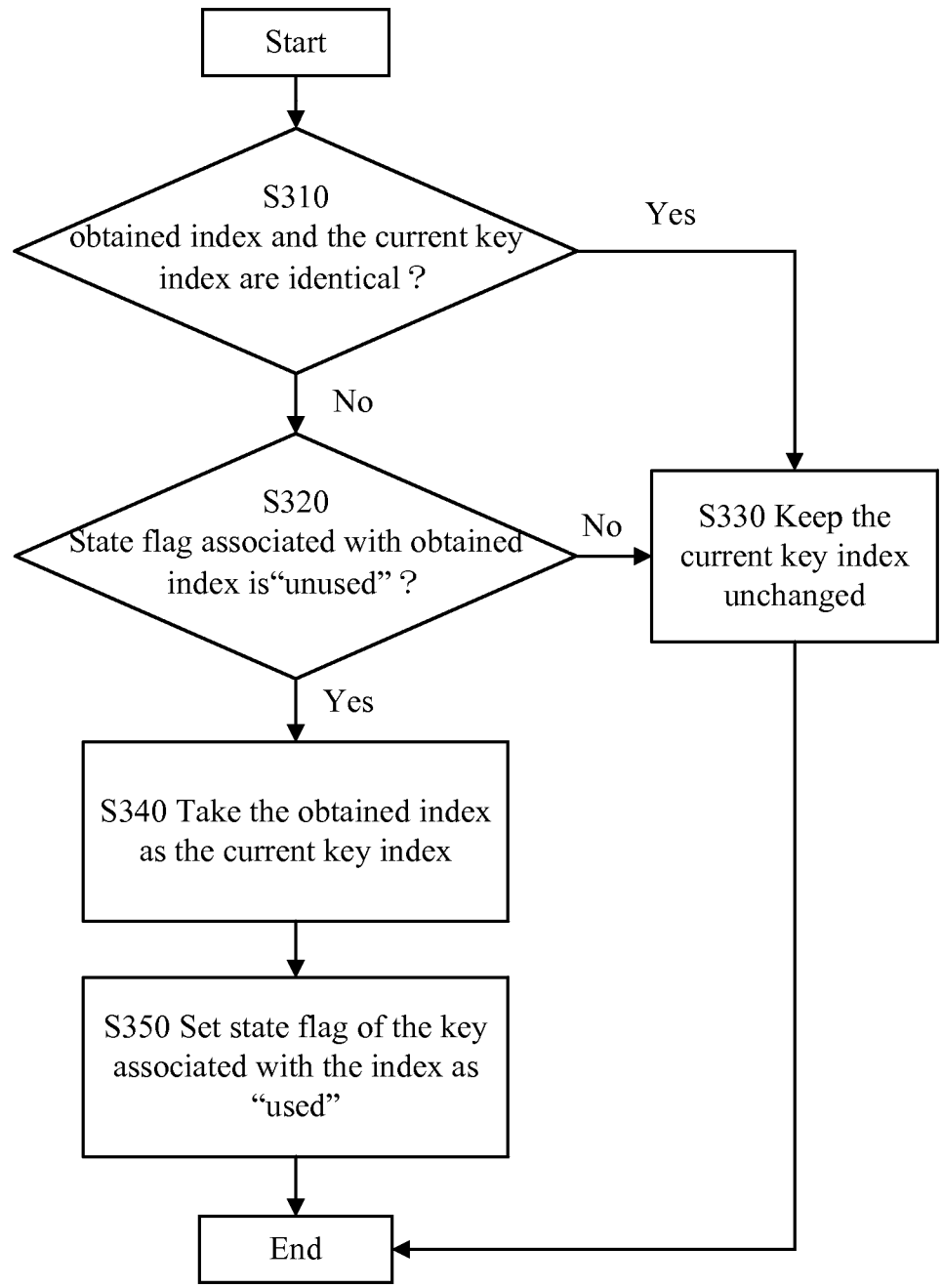
FIG. 3 is a flow chart of an example of an implementation of a process for managing a current key index in a decryption process according to an embodiment of the present subject matter.

FIG. 3 is a flow chart of an example of an implementation of a process for managing a current key index in a decryption process, that may be used to implement step S270 in FIG. 2. At step S310, each time the second network entity obtains the attached key index from the data, it compares the obtained index with the current key index as maintained at present to determine whether they are identical. If so (the branch of step S310 is "yes"), it may be determined that the currently received data has been encrypted with the most-recently distributed key, and thus the current key index is maintained unchanged (step S330). The process ends accordingly.

On the other hand, if the obtained index is different from the current key index ("No" at step S310), then at step S320, the second network entity determines whether the state flag of the key associated with the obtained index is "unused." This step is to handle any possible network transmission delay. For example, in the case of using a cyclic queue for a key table, if the arrival of the key as previously transmitted at the second network entity is delayed, though the attached index may be identical with the current key index as currently maintained by the second network entity, the corresponding key may not be the most-recently distributed key. In this case, a determination of whether the key is the most-recently distributed key may be determined through step S320 (because the state flag of the most-recently distributed key should be "unused").

If the state flag of the key associated with the obtained index is "used" (the branch of step S320 is "No"), it indicates that the key is not the most-recently distributed, while the second network entity keeps the current key index unchanged (S330). The process ends accordingly.

On the other hand, if the state flag of the key associated with the obtained index is "unused" (the branch of step S320 is "Yes"), then the second network entity determines that the current data has been encrypted with latest key that has been stored but not used yet. In this case, at step S340, the obtained index is taken as the current key index.

Then at step S350, the state flag of the key associated with the index (namely, the current key index) is set as "used." The process ends accordingly.

Referring back to FIG. 2, through managing the current key index at step S270, in some embodiments, the first network entity and the second network entity may use the most-recently distributed key to protect bi-directional communication therebetween. Thereby, protection strength and security level are improved.

It should be understood that management of the current key index by the second network entity may improve the protection strength, and may facilitate the receiving party to transmit data to the sending party in an encrypted way. However, it is not necessarily needed. In other cases (for example, other keys in the key table may not be expired yet, and there is only a one-way communication from the first network entity to the second network entity, or plain text communication is allowed, etc.), step 270 may be omitted.

Figure 4:
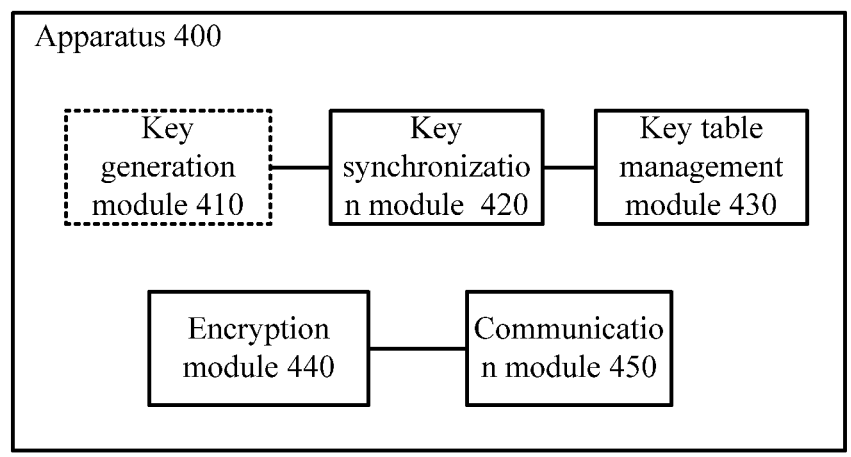
FIG. 4 is a block diagram of an example of an implementation of an apparatus for dynamic encryption for network communication according to an embodiment of the present subject matter.

FIG. 4 is a block diagram of an example of an implementation of an apparatus 400 for dynamic encryption for network communication. As shown in FIG. 4, the apparatus 400 includes a key generation module 410, a key synchronization module 420, a key table management module 430, a key encryption module 440, and a communication module 450.

The key generation module 410 is for generating a key to be used in a network communication according to an effective lifetime configuration of the key and/or other suitable standard. As described above, the key may also be obtained from another source instead of being generated within the apparatus 400. In this case, the key generation module 410 may be considered optional (expressed with the dotted line in the figure).

The key synchronization module 420 may distribute a key to a destination network entity. In an embodiment, the key synchronization module 420 may distribute a key over a security channel. In other embodiments, the key synchronization module 420 may distribute a key in another electronic and/or physical manner. The key synchronization module 420 may further be configured for using the index of the latest distributed key in the key table as the current key index, such that the latest distributed key is used for encrypting and decrypting data in a subsequent communication with the network entity.

The key table management module 430 is for storing the key in the key table. The key table management module 430 may further be configured for receiving, after distributing a key to the receiver network entity, an acknowledgement of reception of the key from the network entity.

The encryption module 440 may be for encrypting data with a key in the key table and attaching the index of the used key in the key table to the encrypted data. In an embodiment, the attachment is implemented by writing the index into one or more unused/reserved bits of the header of the data by the encryption module 440. The encryption module 440 may be further configured for regenerating, before sending the encrypted data, a checksum of the header of the data.

The communication module 450 is for sending the encrypted data to the destination network entity. In particular, the communication module 450 may, for example, send encrypted data over a public network.

As such, the apparatus 400 provides for dynamic encryption for network communication, including: a key synchronization module for distributing a key to a network entity; a key table management module for storing the key into the key table; an encrypting module for using the key in the key table to encrypt data, and attaching an index of the used key in the key table to the encrypted data; and a communication module for sending the encrypted data to the network entity.

Figure 5:
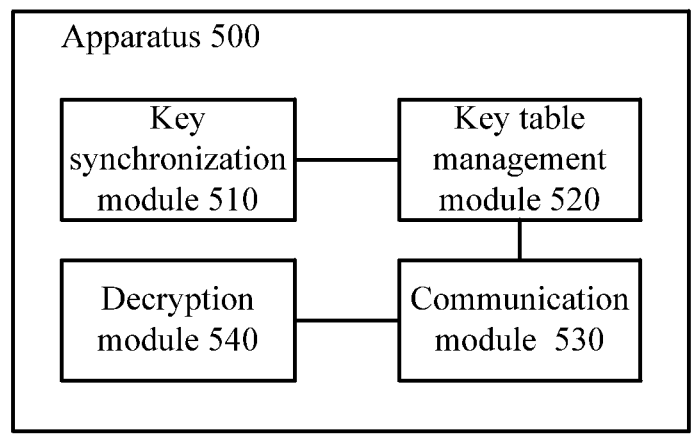
FIG. 5 is a block diagram of an example of an implementation of an apparatus for dynamic decryption for network communication according to an embodiment of the present subject matter.

FIG. 5 is a block diagram of an example of an implementation of an apparatus 500 for dynamically decrypting network communication. As shown in FIG. 5, the apparatus 500 includes a key synchronization module 510, a key table management module 520, a communication module 530, and a decryption module 540.

The key synchronization module 510 is for receiving a key from a network entity. In an embodiment, the key synchronization module 510 may receive the key over a security channel. In other embodiments, the key synchronization module 510 may receive the key in another electronic and/or physical manner. The key synchronization module 510 may be further configured for sending an acknowledgement to the network entity after reception of the key.

The key table management module 520 is for storing the received key in the key table. The key table management module 520 may be further configured for setting a state flag of the key as "unused" state after storing the received key in the key table. After the communication module 530 receives the encrypted data and the decryption module 540 obtains the key index from the data (described below), the key table management module 520 may be further configured for: in response to the index being different from the current key index as maintained at present and the state flag of the key associated with the index being "unused" state, setting the state flag of the key as "used" state, and using the index as the current key index.

The communication module 530 is for receiving encrypted data from the network entity. In particular, the communication module 530, for example, may receive encrypted data over a public network.

The decryption module 540 is for locating a key in the key table according to the index attached to the received data, and using the located key to decrypt the data. In an embodiment, the index of the key is written in one or more unused/reserved bits of the header of the received data.

Method and apparatus for dynamic encryption and decryption in a communication network according to the present subject matter have been described above. Hereinafter, the encryption and decryption principles of the present invention will be illustrated in more detail with reference to the network communication time-sequence diagram as shown in FIG. 6.

As such, the apparatus 500 provides for dynamic decryption for network communication, including: a key synchronization module, for receiving a key from a network entity; a key table management module, for storing the received key into the key table; a communication module for receiving encrypted data from the network entity; and a decrypting module for locating a key in the key table based on an index attached to the data and decrypting the data with the located key.

Figure 6:
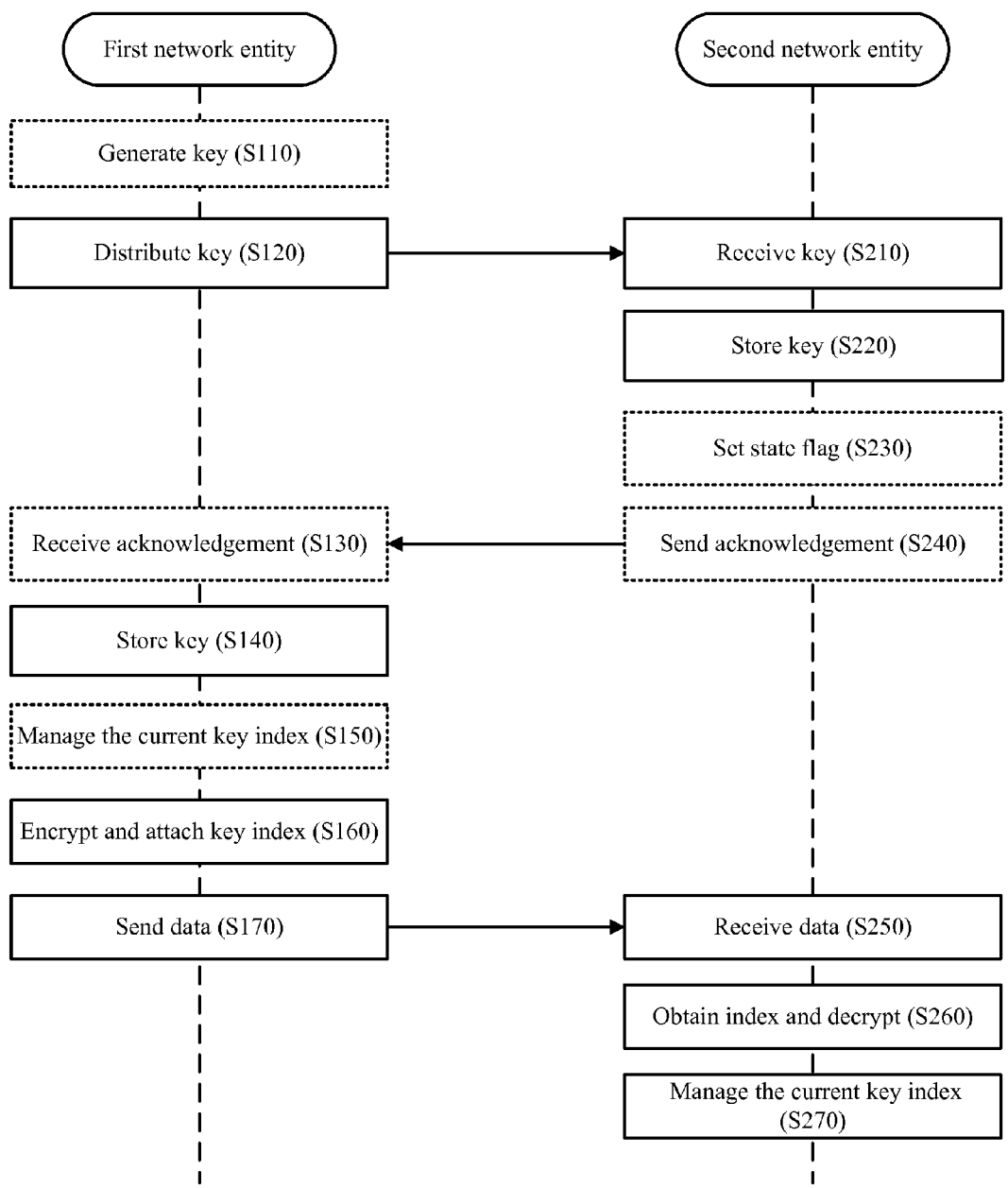
FIG. 6 is a time-sequence diagram of an example of an implementation of a dynamic encryption and decryption process according to an embodiment of the present subject matter.

FIG. 6 is a time-sequence diagram of an example of an implementation of a dynamic encryption and decryption process. It should be noted that in an example as depicted in FIG. 6, the first network entity may correspond to the apparatus 400 as depicted with reference to FIG. 4, and the second network entity may correspond to the apparatus 500 as depicted with reference to FIG. 5. It should be further noted that the first network entity and the second network entity have implemented all steps including the optional steps, where the optional steps are expressed in dotted line. In other embodiments, one or more optional steps may be omitted.

As shown in FIG. 6, the first network entity dynamically generates a key according to, for example, an effective lifetime configuration of the key (S110). Then, the first network entity distributes the key to the second network entity (S120). The key is distributed over a security channel, for example. The second network entity receives the key from the first network entity (S210), stores the received key in the key table (S220), and sets the state flag of the key as "unused" (S230). Then, the second network entity sends back an acknowledgement to the first network entity (S240). After receiving the acknowledgement from the second network entity (S130), the first network entity determines that the second network entity has obtained the distributed key. As response, the first network entity also stores the key in its key table (S140). Optionally, the first network entity may use the index of the latest distributed key in the key table as its current key index (S150). In this way, the first network entity and the second network entity implement distribution and synchronization of the new key.

Then, the first network entity selects a key from the key table, encrypts the data to be transmitted with the selected key, and attaches an index of the used key to the encrypted data (S160). In some embodiments, the first network entity selects a key associated with the current key index (namely, the latest distributed key) to encrypt data.

The first network entity sends the encrypted data to the second network entity (S170). The data are transmitted over, for example, a public network. The second network entity receives the encrypted data (S250). Then, the second network entity extracts an index of the key from the encrypted data. The second network entity locates a key in the key table with the index, and then decrypts the data with the located key (S260). Thus, the process of sending encrypted data from the first network to the second network may end.

In some embodiments, the second network entity manages the current key index (S270), so as to maintain a latest distributed key synchronized with the first network entity. This step, for example, may be implemented through the process as depicted with reference to FIG. 3. In the case that the second network entity maintains a current key index, when it sends data to the first network entity afterwards, it may encrypt data with a key associated with the current key index (namely, a key most-recently distributed by the first network entity). Correspondingly, the first network entity may decrypt data with the key associated with the current key index. In this way, data communication may always be protected with the latest distributed key, which therefore raises the security level.

Embodiments of the present invention provide a light-weighted network security solution by dynamically updating a key table and attaching a key index in the transmitted data. According to the present invention, it is enabled to dynamically distribute and synchronize a key based on a network state, to thereby realize a higher key agility and support customization of encryption processing. In particular, according to some embodiments of the present invention, a technical solution of the present invention may be implemented with a known network protocol data structure and format, thereby achieving a higher compatibility and efficiency. Additionally, according to some embodiments of the present invention, encryption and decryption may be implemented with less storage and processing resources.

Figure 7:
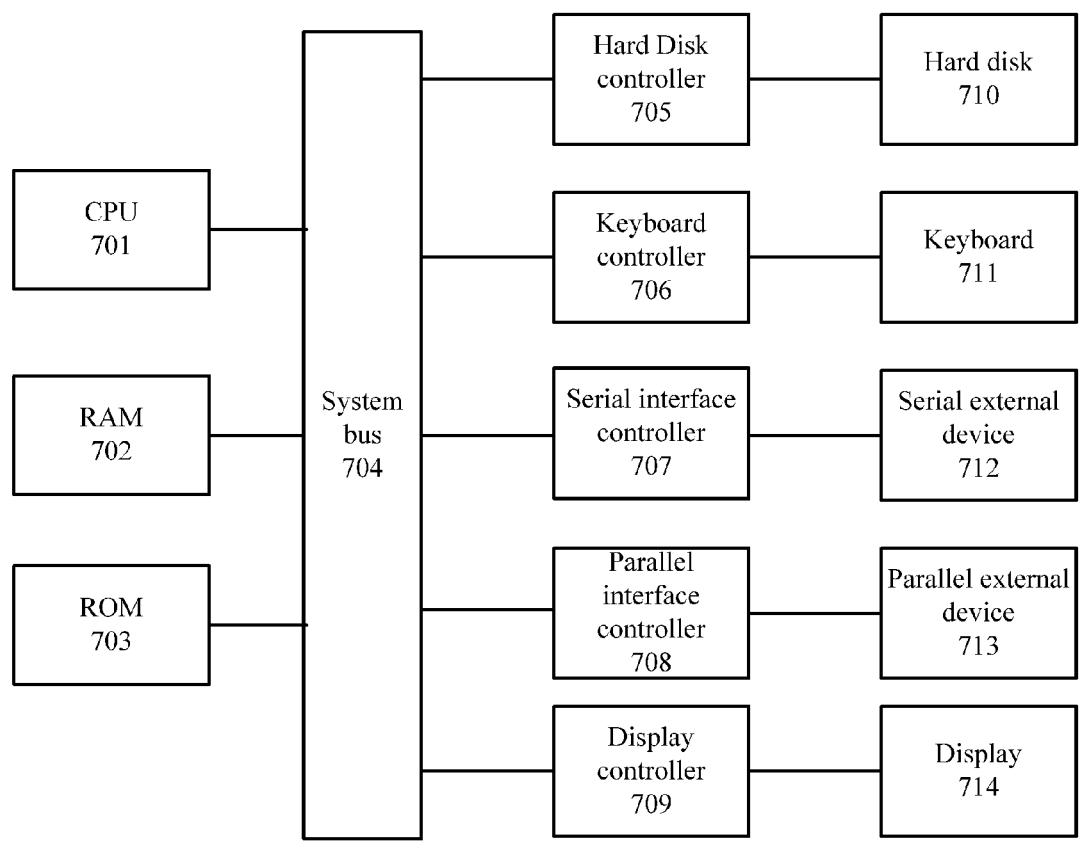
FIG. 7 is a structural block diagram of an example of an implementation of a computing device suitable for use in implementing dynamic encryption and decryption for network communication according to the present subject matter.

FIG. 7 is a structural block diagram of an example of an implementation of a computing device suitable for use in implementing dynamic encryption and decryption for network communication. The computer system as shown in FIG. 7 includes a CPU (Central Processing Unit) 701, a RAM (Random Access Memory) 702, a ROM (Read Only Memory) 703, a system bus 704, a hard disk controller 705, a keyboard controller 706, a serial interface controller 707, a parallel interface controller 708, a monitor/display controller 709, a hard disk 710, a keyboard 711, a serial peripheral/external device 712, a parallel peripheral/external device 713 and a monitor/display 714. Among these components, connected to the system bus 704 are the CPU 701, the RAM 702, the ROM 703, the hard disk controller 705, the keyboard controller 706, the serial interface controller 707, the parallel interface controller 708 and the monitor/display controller 709. The hard disk 710 is connected to the hard disk controller 705; the keyboard 711 is connected to the keyboard controller 706; the serial peripheral/external device 712 is connected to the serial interface controller 707; the parallel peripheral/external device 713 is connected to the parallel interface controller 708; and the monitor/display 714 is connected to the monitor controller 709.

It should be understood that the structural block diagram in FIG. 7 is shown only for illustration purposes, and is not intended to limit the invention. In some cases, some devices may be added or removed as required.

The present disclosure discloses method and apparatus for dynamic encryption and decryption for network communication. The technical solution according to the present invention is a light-weighted network security solution that may be implemented, managed, and modified dynamically. The present technology provides an approach to dynamically generate, distribute, synchronize, and use a key based on factors such as effective lifetime requirement of the key and network condition(s), to implement a higher key agility and to achieve a higher protection strength and security level. Moreover, the present technology may support custom implementation of encryption and decryption, for example supporting a dedicated hardware-based implementation.

In particular, according to some embodiments of the present invention, a technical solution of the present invention may be implemented with a known network protocol data structure and format, thereby achieving a higher compatibility and efficiency. In addition, the present technology allows encryption and decryption to be implemented with less storage and processing resources.

As will be appreciated by one skilled in the art, aspects of the present invention may be embodied as a system, method or computer program product. Further, the embodiments of the present invention may be implemented in software, hardware, or a combination thereof. The hardware part may be implemented by a special logic; the software part may be stored in a memory and executed by a proper instruction execution system such as a microprocessor or a dedicated designed hardware. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. The apparatuses and their components in these embodiments may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

The communication network as described in this specification may comprise various kinds of networks, including but not limited to local area network (LAN), wide area network (WAN), an IP-protocol based network (for example Internet), and an end-to-end network (for example ad hoc network).

It should be understood that, though operations of the present subject matter have been described in a particular order in the drawings, such description does not require or imply that these operations must be performed according to this particular sequence, or a desired outcome can only be achieved by performing all shown operations. On the contrary, the execution sequences for the steps as depicted in the flowcharts may change. Additionally or alternatively, some steps may be omitted, a plurality of steps may be merged into one step, or a step may be divided into a plurality of steps.

Though the present invention has been described with reference to a plurality of embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

The invention claimed is:

1. A method, comprising:

distributing a new key from a first network entity to a second network entity, where distribution of the new key synchronizes use of the new key in communications between the first network entity and the second network entity;

storing, at the first network entity, the new key in a dynamically-synchronized key table that is synchronized dynamically in cyclic order over time between the first network entity and the second network entity by distribution of additional new keys from the first network entity to the second network entity;

encrypting data with an indexed key in the dynamically-synchronized key table;

attaching an index of the indexed key in the dynamically-synchronized key table to the encrypted data; and sending the encrypted data with the attached index of the indexed key from the first network entity to the second network entity.

2. The method according to claim 1, further comprising:
receiving, in response to distributing the new key to the second network entity, an acknowledgement that the second network entity has received the new key and that key synchronization is complete.

3. The method according to claim 1, further comprising:
using an index of a latest distributed key of a plurality of distributed and synchronized keys stored in the dynamically-synchronized key table as a current key index, such that the latest distributed key is used for encrypting and decrypting data in a subsequent communication between the first network entity and the second network entity.

4. The method according to claim 1, further comprising:
generating, at the first network entity, the new key to be distributed according to an effective lifetime configuration of the new key.

5. The method according to claim 1, where the dynamically-synchronized key table is a cyclic queue with a queue length based upon key index specification constraints of a data packet header of a communications protocol used for the communications between the first network entity and the second network entity.

6. The method according to claim 1, where attaching the index of the indexed key in the dynamically-synchronized key table to the encrypted data comprises writing the index to at least one unused bit of a data packet header used to send the encrypted data with the attached index of the indexed key to the second network entity.

7. The method according to claim 6, further comprising:
regenerating a checksum of the data packet header before sending the encrypted data with the attached index of the indexed key to the second network entity.

8. The method according to claim 1, where distributing the new key from the first network entity to the second network entity comprises distributing the new key to the second network entity over a security channel.

9. A method, comprising:
receiving a new key from a first network entity at a second network entity;

storing, at the second network entity, the received new key in a dynamically-synchronized key table, where storing the received new key in the dynamically-synchronized key table synchronizes use of the new key in cyclic order in communications between the first network entity and the second network entity;

receiving encrypted data from the first network entity, where the encrypted data comprises an attached index;

locating an indexed key in the dynamically-synchronized key table according to the index attached to the encrypted data; and decrypting the encrypted data with the located indexed key.

10. The method according to claim 9, further comprising:
sending an acknowledgement to the first network entity in response to storing the received new key in the dynamically-synchronized key table as confirmation that key synchronization is complete.

11. The method according to claim 9, where the dynamically-synchronized key table is a cyclic queue with a queue length based upon key index specification constraints of a data packet header of a communications protocol used for the communications between the first network entity and the second network entity.

12. The method according to claim 9, further comprising:
setting, in response to storing, at the second network entity, the received new key in the dynamically-synchronized key table, a state flag of the received new key to an unused state.

13. The method according to claim 12, where if the index attached to the encrypted data is different from a current key index maintained in association with the dynamically-synchronized key table and if the indexed key in the dynamically-synchronized key table at the index attached to the encrypted data comprises the state flag with the unused state, then:
assigning the index attached to the encrypted data as a new current key index; and setting the state flag of the indexed key in the dynamically-synchronized key table at the new current key index assigned from the index attached to the encrypted data to a used state; and where the indexed key in the dynamically-synchronized key table at the new current key index is used to encrypt data sent to the first network entity.

14. The method according to claim 9, where the index attached to the encrypted data is written in at least one unused bit of a header of the received encrypted data.

15. The method according to claim 9, where receiving the new key from the first network entity comprises receiving the new key over a security channel.

16. An apparatus, comprising:
a memory;
a communication module; and
a processor programmed to:
distribute a new key from a first network entity to a second network entity, where distribution of the new key synchronizes use of the new key in communications between the first network entity and the second network entity;

store, at the first network entity, the new key into a dynamically-synchronized key table that is synchronized dynamically in cyclic order over time between the first network entity and the second network entity by distribution of additional new keys from the first network entity to the second network entity;

encrypt data with an indexed key in the dynamically-synchronized key table;

attach an index of the indexed key in the dynamically-synchronized key table to the encrypted data; and send the encrypted data with the attached index of the indexed key from the first network entity to the second network entity via the communication module.

17. An apparatus, comprising:
a memory;
a communication module; and
a processor programmed to:

receive a new key from a first network entity at a second network entity via the communication module;

store, at the second network entity, the received new key in a dynamically-synchronized key table, where storing the received new key in the dynamically-synchronized key table synchronizes use of the new key in cyclic order in communications between the first network entity and the second network entity;

receive encrypted data from the first network entity via the communication module, where the encrypted data comprises an attached index;

locate an indexed key in the dynamically-synchronized key table according to the index attached to the encrypted data; and decrypt the encrypted data with the located indexed key.

* * * * *